Patented Sept. 7, 1937

2,092,324

UNITED STATES PATENT OFFICE 2,092,324

TREATMENT OF CREAM PRODUCT

John H. Nair, Syracuse, N. Y., assignor to The Borden Company, New York, N. Y., a corporation of New Jersey No Drawing. Application September 13, 1934, Serial No. 743,836

12 Claims. (Cl. 99—60)

This invention relates to the preparation of a scalded cream product and more particularly to the treatment of cream to produce a scalded cream product similar to Devonshire or Yorkshire cream, which is a sweet cream of high fat content, characterized by a marked scalded flavor and extremely heavy, plastic consistency.

In the production of Devonshire or Yorkshire cream it is common practice to subject the whole milk to a scalding treatment, after which the product is stored in a cool place for about 24 hours and the cream is then skimmed off of the milk and is ready for market. Such methods are obviously ill-adapted to the production of commercial quantities of a uniformly high quality of such cream. Numerous efforts made to manufacture the product from separated cream have failed to give the characteristic consistency. The high temperature of scalding causes the aggregates of milk fat to separate, leaving a watery mass which is not usable as Devonshire cream.

It is an object of the present invention to provide a method for producing a scalded cream product, such as Devonshire cream, from separated cream. Another object is to provide a process in which the cream may be scalded and subsequently treated to provide a cream product of the desired consistency. Other objects will become apparent.

In carrying out my improved process the cream is separated from the milk and heated to the temperature, and for the time, required to give the desired scalded flavor, the mass being slowly and uniformly agitated at the time. It is then preferably cooled to a temperature below the solidification point of the butter fat in the cream and is maintained at or below that temperature for a short time, after which it is slowly warmed with uniform and gentle agitation to a temperature slightly below the melting point of the butter fat in the cream. It is then cooled slowly to a temperature such as to give the desired consistency and may be thereafter stored or distributed.

As a specific illustration of my process, the raw cows' milk is separated so as to produce a cream containing 50 to 60% of milk fat. This separated cream is then placed in a pasteurizing vat or tank of suitable capacity and hot water is applied to the walls to heat the cream to about 180 to 195° F. It is then held at that temperature until the desired scalded flavor has been obtained, which usually requires about 45 to 60 minutes. During this scalding period the cream is slowly agitated to prevent local overheating and to keep oiling-off of the fat at a minimum. The temperature and time may, of course, be varied to increase or decrease the scalded flavor of the product.

When the desired flavor is developed, the cream is preferably cooled quickly, for example, by pumping it over an ordinary surface type of milk cooler. However, it may be cooled more slowly, for example, in the vat or in any other cooling equipment available. After the cream is cooled to about 40° to 50° F., and preferably maintained at that temperature for about 30 to 120 minutes where maximum increase in viscosity is desired, it may be returned to a suitable vat or tank in which it is slowly rewarmed to a point about 3° to 10° F. below the melting point of the solid fat in the cream. The melting point of the milk fat varies with the season, breed of cows, feed and possibly other factors, but usually lies between 80° and 95° F. generally about 85° F. This rewarming is preferably completed in about 20 to 40 minutes, employing continuous gentle agitation.

When the cream attains the required temperature, the warm water from the vat is drained off as quickly as possible and cold water is turned into the jacket and/or coils. The agitation and cooling are continued at slow uniform rates until the thickening of the cream becomes quite noticeable. This will generally occur between 50° and 60° F. The cream is now removed to suitable containers and placed in a refrigerating room maintained at a suitable storage temperature, say between 35 and 45° F. It may be stored there until delivery to the customer.

The operation described produces a fine flavored, scalded, clotted cream, of low acidity, good keeping quality, sweet and pleasant to taste and plastic in consistency. It may be made identical in flavor and consistency with the highest grade Devonshire cream. If it becomes too stiff to handle conveniently, a lower percentage of fat may be used in the cream, or the temperature to which it is rewarmed may be lowered or the temperature to which it is cooled may be raised.

The cooling after rewarming, referred to herein, is preferably conducted at an average rate of about 1° to 5° F. per minute, and preferably about 1° to 2° F. per minute.

The agitation should be uniform and as gentle as possible commensurate with the desired heat transfer, but insufficient to cause incipient churning or separation of the emulsion.

The temperatures and times given herein are merely illustrative, it being obvious that other details of operation may be preferred in particular instances and that other conditions may be required in the treatment of particular products and for the purpose of obtaining particular results.

The terms used in describing and claiming the invention have been used as terms of description and not of limitation and it is intended that all equivalents thereof be included within the scope of the appended claims.

The solidification point of the milk fat referred to herein may be determined as follows: Introduce 25 cc. of the melted butter fat into a glass test tube approximately 1½ inches in diameter by 6 inches long and support the tube in a water bath maintained at a temperature of about 5° F. below the supposed solidification temperature. Stir the fat by means of a thermometer until the mass solidifies, noting the temperature carefully from time to time. After a steady fall the temperature will be seen to rise and the highest point then reached is taken as the solidification point.

The melting point may be determined by the capillary tube method described in the "Methods of Analysis of the Association of Official Agricultural Chemists," 3rd Ed. (1930), p. 317.

What I claim is:

1. A process for preparing a scalded cream product, comprising separating the cream from milk and heating it while separated to a scalding temperature for a sufficient time to give the desired scalded flavor, cooling the scalded cream to a temperature substantially below the melting point of butter fat in the cream, rewarming it to a temperature slightly below the melting point of the butter fat and cooling it until it attains the desired consistency.

2. A process as defined in claim 1 in which the cream is gently agitated during the heating and cooling steps.

3. A process for preparing a clotted scalded cream product, comprising separating the cream from milk, heating it while separated to a scalding temperature below the boiling point of the cream for a sufficient time to give the desired scalded flavor, cooling the scalded cream to a temperature below the solidification point of the fat in the cream, slowly rewarming it to slightly below the melting point of the butter fat in the cream and slowly cooling it until it attains the desired clotted consistency.

4. A process as defined in claim 3 in which the cream is gently agitated during the heating and cooling steps.

5. A process as defined in claim 3 in which the temperature below the solidification point of the fat in the cream is maintained for a few minutes before the cream is rewarmed.

6. A process for producing a scalded, thickened dairy product, comprising separating cream containing about 50 to 60% milk fat, scalding the separated cream at a temperature of about 195° F. for 45 to 60 minutes, cooling the scalded cream to a temperature between about 40° and 50° F., rewarming said cream to about 80° to 90° F., and cooling said rewarmed cream to about 50° to 60° F.

7. A process as defined in claim 6 in which the cream is gently agitated during the rewarming and subsequent cooling steps.

8. A process as defined in claim 6 in which the scalded product is maintained at 40° to 50° F. for about 30 to 120 minutes before it is rewarmed.

9. A process for the production of a scalded cream product comprising separating a high-fat cream from raw cows' milk, scalding said cream, while separated, at temperatures below the boiling point, cooling said scalded cream to below 50° F., rewarming said cream to a temperature slightly below the melting point of the contained milk fat and cooling said rewarmed cream until it thickens.

10. A process as defined in claim 9 in which the scalded cream is maintained below 50° F. for a few minutes before rewarming.

11. A process for the production of a pasty, non-fluid clotted cream product comprising subjecting a separated cream containing not less than 50% butter fat to scalding temperatures below the boiling point of the cream, cooling the scalded cream to below 50° F., rewarming said cream to a temperature slightly below the melting point of the contained milk fat and cooling said rewarmed cream until it thickens to the desired clotted consistency.

12. A process for the production of a scalded cream product of heavy clotted consistency, comprising separating from milk a cream containing 55 to 60% butter fat, heating the separated cream and holding it at a temperature of about 195° F. for at least about one hour with agitation, cooling the scalded cream to about 40° F. and holding it for about two hours at that temperature, rewarming it to about 85° to 87° F. with agitation, and recooling it with agitation to as near 50° F. as is practical to handle the increasingly plastic cream.

JOHN H. NAIR.